United States Patent Office 3,444,187
Patented May 13, 1969

3,444,187
NOVEL β-HALOGLUTAMATE AND α,β-DEHYDRO-GLUTAMATE COMPOUNDS
Jisaburo Ueyanagi, Nishinomiya, Hidesuke Iwasaki, Itami, Takaaki Kamiya, Takatsuki, and Osamu Oka, Sakai, Japan, assignors to Takeda Chemical Industries, Ltd., Osaka, Japan
No Drawing. Filed Dec. 22, 1965, Ser. No. 515,727
Claims priority, application Japan, Dec. 23, 1964, 39/72,965; Mar. 25, 1965, 40/17,585
Int. Cl. C07c 103/22, 103/46, 101/22
U.S. Cl. 260—471                                    7 Claims

ABSTRACT OF THE DISCLOSURE

A method is provided for producing compounds of the formula

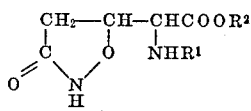

wherein $R^1$ is H or a carboxylic acid acyl group having up to seven carbon atoms and $R^2$ is H or a lower alkyl group. A compound of the formula

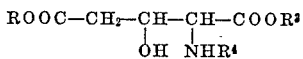

wherein R and $R^3$ represent the same or different lower alkyl groups and $R^4$ is H or a carboxylic acyl group having up to seven carbon atoms is halogenated to yield a compound of the formula

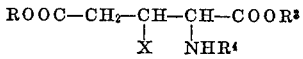

The latter compound is subsequently reacted with hydroxylamine and the resultant product treated with a base to produce the final products. Novel intermediate compounds of the formulae

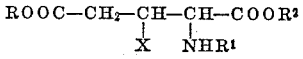

and

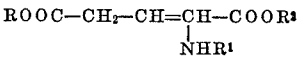

are also provided.

---

This invention relates to a novel method for preparing the compounds represented by the formula

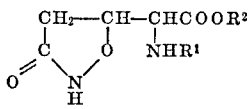 (I)

wherein $R^1$ is H or a carboxylic acid acyl group having up to 7 carbon atoms and $R^2$ is H or a lower alkyl group, and novel and useful intermediates therefor represented by the formula

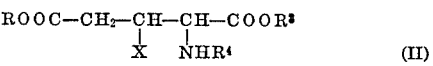 (II)

wherein R and $R^3$ are the same or different lower alkyl groups, X is a halogen atom and $R^4$ is H or a carboxylic acid acyl group having up to 7 carbon atoms.

(Hereinafter the compounds

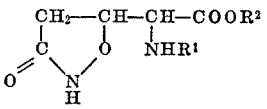

and those representable by

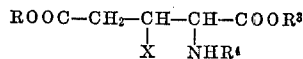

wherein R, $R^1$, $R^2$, $R^3$, $R^4$ and X have the same meaning as mentioned above, are referred to as Compound I and Compound II, respectively.)

While Compound I shows a strong insecticidal action, tricholomic acid [(3-oxo-isoxazolidin-5-yl)-α-aminoacetic acid] which is within the scope of Formula I has an effect for enhancing or improving the flavor or taste of foods, and therefore is useful as a chemical condiment.

Though tricholomic acid has been known to be obtainable by extracting *Tricholoma muscarium* Kawamura, no one has prior to this invention succeeded in obtaining Compound I, even tricholomic acid itself, by the chemical synthesis. The present invention successfully accomplishes the chemical synthesis of Compound I, namely, by halogenating the compound:

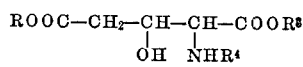 (III)

wherein R, $R^3$ and $R^4$ have the same meaning as mentioned above (hereinafter referred to as Compound III) with a halogenating agent to give Compound II, and subsequently reacting Compound II with hydroxylamine and then by reacting the resultant product with a base.

It is an object of this invention to embody a novel procedure for obtaining Compound I. Another object of this invention is to embody Compound II and a method for preparing the same. Further object of this invention is to enable Compound I to be produced on an industrial scale.

Throughout the specification, R is a lower alkyl group such as methyl, ethyl, propyl, tertiary butyl, etc.; $R^1$ and $R^4$ are H or a carboxylic acid acyl group having up to 7 carbon atoms, such as a benzoyl group or an acetyl group; $R^2$ is H or a lower alkyl group such as methyl, ethyl, propyl, isopropyl, etc.; $R^3$ is a lower alkyl group such as methyl, ethyl, propyl, tertiary butyl, etc. The acyl group may have one or more substituents, such as fluorine.

Compound II is a novel compound which is preparable by halogenating Compound III with a halogenating agent. As the halogenating agent, there are employed phosphorus pentahalide such as phosphorus pentachloride; phosphorus trihalide such as phosphorus tribromide; thionyl chloride; etc. The halogenating agent is preferably used in a slight excess above the theoretical amount. The reaction is carried out by contacting the said halogenating agent with Compound III at a low temperature, optionally in a solvent. As solvent there is, for example, used chloroform, carbon tetrachloride, methylene chloride, acetyl chloride, etc.

Thus-obtained Compound II is converted to Compound I by reacting the former with hydroxylamine and then reacting the resultant product with a base. Generally, it is preferable to carry out the reaction under cooling or at room temperature (20–30° C.) in a solvent such as water or a hydrophilic organic solvent, e.g. methanol, ethanol. The theoretical amount of hydroxylamine is sufficient for carrying out the reaction.

The reaction procedure can be modified as follows:

(1) by reacting Compound II with hydroxylamine in the presence of a base;

(2) by eliminating hydrogen halide from Compound II with the aid of a base, and subsequently reacting the product with hydroxylamine in the presence of a base.

Depending on the particular acyl group attached to the amino group of Compound II, the acyl group may or may not be eliminated from the acylamino group by the aforedescribed ring closure reaction. When the ring closure reaction is not accompanied by deacylation, N-acyltricholomic acid of the formula

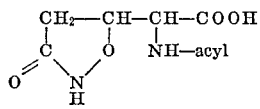

is obtained, and if it is desired to produce tricholomic acid per se, the N-acyltricholomic acid is subjected to the deacylation reaction with per se conventional means for the deacylation of an amino group, e.g. by treating the said N-acyl compound with an acid or a base.

Even when $R^3$ is a lower alkyl group, the reaction product may be

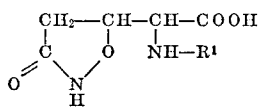

depending on the particular base. However, when the hydrolysis of $COOR^3$ of Compound I is not brought about and it is expected to obtain tricholomic acid, the compound:

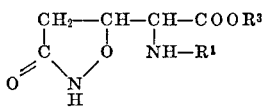

may be subjected to conventional ester hydrolysis, e.g. by treating the said compound

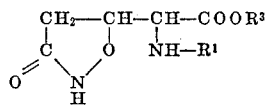

with an acid or a base.

In the above-mentioned modification (1),

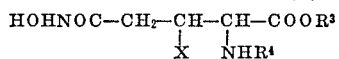

appears to be the intermediate which is converted to Compound I in the presence of a base; further, in modification (2), elimination of hydrogen halide from Compound II gives the compound

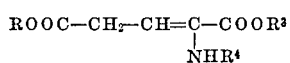

which is converted to

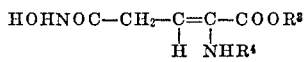

with hydroxylamine, and thus-prepared

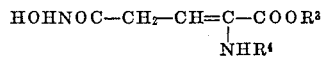

is converted to Compound I in the presence of a base.

The reaction mixture is subjected to reaction as is, or after the intermediate is isolated.

If desired, the reaction with hydroxylamine is carried out after acylating the amino group of Compound II by treating with an acylating agent such as benzoylchloride, acetic anhydride, etc.

As the base employed in the method of this invention, there may, for example, be used alkali hydroxide such as sodium hydroxide, potassium, hydroxide; alkali alkoxide such as sodium alkoxide, potassium alkoxide; alkali carbonate; organic bases such as quinoline, collidine, trialkyl amine, dialkyl aniline, etc. It is necessary to employ not less than 1 mol, preferably 2 to 8 mols, of base per mol of Compound II.

By this reaction, Compound I is obtained as a mixture of threo and erythro isomers. It is not necessary to separate the threo and erythro isomers from each other when Compound I is used as an insecticide or chemical condiment. If desired, the mixture of threo and erythro isomers can be separated by recrystallization, ion exchanger chromatography, etc.

More concretely stated, when either erythro or threo isomer is contained in excess relative to its isomer in the mixture, the separation is carried out by subjecting the mixture to recrystallization from water or a hydrophilic organic solvent such as alcohol, acetone, or a mixture thereof, whereby the excess amount of either erythro or threo isomer is crystallized. When the mixture contains nearly the same amount of erythro isomer and threo isomer, the separation is carried out by means of ion exchanger chromatography, using e.g. strongly acidic cation exchange resin, e.g. Dowex 50 (Dow Chemical Co., nuclear sulfonic, styrene base), Amberlite CG-120 (Rohm & Haas Co., carboxylic acid acrylic acid); and strongly basic anion exchange resin such as Dowex 1 (Dow Chemical Co., quaternary strong base), Amberlite CG-400 (Rohm & Haas Co., quaternary strong base). It may be preferable to employ ion exchangers of neutralized form with weak base such as pyridine or weak acid such as acetic acid. As the developer, there is employed a volatile weak acid such as dilute acetic acid, water, or a buffer solution in which the buffering agent is volatile, such as pyridine acetate or pyridine formate buffer. Generally, the separability is enhanced by adding hydrophilic organic solvent such as alcohols or ketones to the said developer. When cation exchange resin is used, firstly threo isomer and then erythro isomer of Compound I is eluated; when anion exchange resin is employed, firstly erythro isomer and then threo isomer of Compound I is eluted. Fractions eluted at an early stage contain either erythro or threo isomer of Compound I in a pure state, but later fractions contain both erythro and threo isomers of Compound I. The mixture can be separated into threo and erythro isomers by means of the recrystallization mentioned above. Further, the separation of erythro and threo isomers can also be carried out by employing the difference in solubility in water between copper salts of the erythro and threo isomers. That is, when copper ion is added to an aqueous solution of a mixture of erythro and threo isomers, the copper salt of erythro isomer precipitates, while the copper salt of threo isomer does not.

Compound I is easily converted to a novel compound

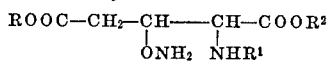

when treated with alcoholic hydrogen halide and the latter is reversible again to Compound I by reaction with one mol of base.

If desired, Compound I can be converted to its alkali salt such as sodium salt, potassium salt or calcium salt by contacting Compound I with the corresponding alkali hydroxide.

Compound I increases in its stability when converted into its alkali salt.

The following examples set forth presently preferred illustrative embodiments of the invention. The relationship between parts by weight and parts by volume is the same as that between grams and milliliters.

Example 1

(A) Into a suspension of 10.2 parts by weight of diethyl β-hydroxyglutamate hydrochloride in 100 parts by volume of acetyl chloride there is stirred dropwise 12.5 parts by weight of finely powdered phosphorus pentachloride, the reaction temperature being kept below 5° C. by ice-cooling. Stirring is then continued for 2 hours under ice-cooling. Acetyl chloride is then distilled off under reduced pressure, and the residue is added to 50 parts by volume of ethanol, pre-cooled with ice and salt, so as to decompose the remaining acetyl chloride and phosphorus pentachloride. Then ethanol is distilled off under reduced pressure and the residue is left standing overnight to give crystals. The crystals are recrystallized from a mixture of ethanol and ether, whereby 4.3 parts by weight of needle-like crystals of diethyl β-chloroglutamate hydrochloride having the melting point of 112–113° C. are obtained.

(B) To 1 part by weight of diethyl β-hydroxyglutamate hydrochloride, thionyl chloride is added until the diethyl β-hydroxyglutamate is dissolved. When diethyl β-chloroglutamate has been produced in maximum (about 1 to 5 hours later), the remaining thionyl chloride is distilled off under reduced pressure. The residue is dissolved in ethanol-ether. Then a very small amount of diethyl β-chloroglutamate hydrochloride is added to the solution as a crystallization nucleus and the mixture is allowed to stand overnight to give crystals. The crystals are recrystallized from ethanol-ether to give 0.5 part by weight of needle-like crystals of diethyl β-chloroglutamate having melting point at 112–113° C.

Example 2

(A) 2.7 parts by weight of diethyl β-chloroglutamate hydrochloride and 16.8 parts by weight of sodium hydrogencarbonate are dissolved in 170 parts by volume of water. To the solution is added 2.8 parts by weight of benzoyl chloride with stirring under ice-cooling. After 6 hours stirring under ice-cooling, the solution is extracted with benzene. The extract is washed with a saturated solution of sodium hydrogencarbonate and water in this order. Then benzene is distilled off under reduced pressure. The residual substance, mixed with petroleum benzin, is left standing in a refrigerator, whereby the substance crystallizes. The crystals are washed with petroleum ether and are recrystallized from a mixture of benzene and petroleum ether, whereby 2.6 parts by weight of colorless platy crystals of diethyl β-chloro-N-benzoylglutamate having the melting point of 59–60° C. is obtained.

(B) Into 5 parts by weight of trifluoroacetic anhydride, there is stirred dropwise 2.2 parts by weight of diethyl β-chloroglutamate hydrochloride. The mixture is stirred under ice-cooling for 10 minutes and then at 60° C. for 10 minutes. Excess of trifluoroacetic anhydride is distilled off under reduced pressure. The residue is refined under reduced pressure to give 2.4 parts by weight of diethyl β-chloro-N-trifluoroacetylglutamate showing the boiling point of 123° C. (0.05 mm. Hg).

(C) 5 parts by weight of diethyl β-chloroglutamate hydrochloride is dissolved in 30 parts by volume of acetic anhydride and the mixture is heated at 80° C. for 1 hour. After removal of the solvent under reduced pressure, the oily residue is subjected to distillation under reduced pressure, whereby 4.6 parts by weight of refined pale yellow diethyl β-chloro-N-acetylglutamate showing the boiling point of 171° C./2 mm. Hg is obtained.

Example 3

(A) 3.42 parts by weight of diethyl N-benzoyl-β-chloroglutamate is dissolved in 30 parts by volume of ethanol. To the solution cooled with ice and salt, there is added dropwise at −5° C., in the course of one hour, a solution of hydroxylamine which is prepared by adding 700 parts by volume of hydroxylamine hydrochloride to 10 parts by volume of 3-normal sodium hydroxide solution, followed by stirring the whole mixture at room temperature for 5 hours. Then ethanol and water are distilled off under reduced pressure, whereby 4.373 parts by weight of (3-oxo-isoxazolidin-5-yl)-α-benzoylaminoacetic acid result.

(B) 2.7 parts by weight of diethyl β-chloroglutamate is dissolved in 20 parts by volume of 50% aqueous methanol. To the solution is added at −5° C. a solution of 0.730 part by weight of hydroxylamine hydrochloride in 20 parts by volume of 2-normal sodium hydroxide solution cooled with ice, followed by stirring at about −3 to −5° C. for 1 hour. Then the reaction mixture is heated to 25° C. and stirred for 3 hours. The reaction mixture is diluted with water to 2 times its original volume, and passed through 70 parts by volume of a column packed with cation exchanger Amberlite IR-120 (H type) [Rohm & Haas Co., nuclear sulfonic (styrene base)]. After washing with 200 parts by volume of water, amino acid is eluted with 300 parts by volume of 0.2 normal aqueous ammonia. The solvent is distilled off at 45° C. under reduced pressure to give 0.400 part by weight of dark blue powder. The powder is chromatographed by means of a column packed with cellulose powder, and is developed with a mixture of normal butanol, acetic acid and water (1 volume:1 volume:1 volume). Eluate containing the component showing the same Rf value with that of natural tricholomic acid obtained by extracting Tricholoma muscarium Kawamura, is collected and the solvent is evaporated under reduced pressure to give 0.100 part by weight of light brown powder. The powder is refined by means of cellulose powder column chromatography (developer: a mixture of methanol, water and pyridine in a ratio of 20:5:1 volume), whereby 0.700 part by weight of (3-oxo-isoxazolidin-5-yl)-α-aminoacetic acid is obtained.

(C) 2.4 parts by weight of diethyl β-chloro-N-trifluoroacetylglutamate is dissolved in 10 parts by volume of methanol, followed by adding dropwise under stirring a solution of 0.520 part by weight of hydroxylamine hydrochloride in 5-normal sodium hydroxide at 5° C. Then the resultant solution is stirred at 0–5° C. for about 1 hour and then at room temperature for 14 hours. After being diluted with 200 parts by volume of water, the reaction mixture is passed through 100 parts by volume of cation exchangers (Amberlite IR-120, H form), amino acids present being adsorbed thereon. After washing with water until the eluate becomes nearly colorless, so-adsorbed amino acid is eluted with 3% aqueous ammonia, followed by removal of the solvent, whereby 0.420 part by weight of powder containing 30% of (3-oxo-isoxazolidin-5-yl)-α-aminoacetic acid is obtained. The powder is chromatographed through a column packed with anion exchange resin (Dowex 1 x 8, acetate form), followed by development with 0.5 normal acetic acid, to give 0.150 part by weight of (3-oxo-isoxazolidin-5-yl)-α-aminoacetic acid.

(D) 4.6 parts by weight of diethyl β-chloro-N-acetylglutamate is dissolved in 5 parts by volume of ethanol. To the solution is added 3 parts by volume of triethylamine and the mixture is stirred at room temperature for 1 hour. The solvent is distilled off under reduced pressure and the residue is extracted with ethyl acetate. The extract is concentrated to give colorless needle-like crystals. The crystals are recrystallized from ethyl acetate, whereby 2.5 parts by weight of diethyl N-acetyl-α,β-dehydroglutamate showing the melting point of 75–76° C. is obtained.

Thus-produced diethyl N-acetyl-α,β-dehydroglutamate (2.2 parts by weight) and 1.2 parts by weight of sodium alcoholate are dissolved in 10 parts by volume of ethanol, followed by adding dropwise under stirring and ice-cooling a solution of 0.625 part by weight of hydroxylamine hydrochloride and 0.615 part by weight of sodium alcoholate in 5 parts by volume of ethanol. The reaction mixture is stirred under ice-cooling for one hour, and then at room temperature for further 2 hours, followed by adjusting the pH to 4 with ethanolic HCl. After removing the precipitates by centrifugation, solvent is distilled off under reduced pressure. The residue is dissolved in 25 parts by volume of 2-normal sodium hydroxide, followed by boiling for 3 hours. After dilution with water to 3 times its volume, the reaction mixtures is passed through a column of Amberlite IR-120 (H type), followed by washing the resin with water. Amino acid is eluted with 3% aqueous ammonia from the resin. The residue obtained by removal of solvent from the eluate is dissolved in 2 parts by volume of 0.5 normal acetic acid, and is chromatographed through a column of anion exchange resin, Dowex 1 x 8 (acetate form), followed by development with 0.5 normal acetic acid, whereby 0.300 part by weight of threo isomer of (3-oxo-isoxazolidin-5-yl)-α-aminoacetic acid is obtained.

(E) To a solution of 6.3 parts by weight of diethyl-β- chloro-N-trifluoroacetylglutamate in 0.200 part by weight of 80% ethanol is added 3 parts by volume of triethylamine, followed by stirring under ice-cooling for 1 hour. To the resultant mixture is added dropwise at —5° C. a solution of 1.4 parts by weight of hydroxylamine in 4 parts by volume of 10-normal sodium hydroxide and 16 parts by volume of 50% ethanol. After 2 hours stirring at —5 to 0° C., the reaction mixture is mixed with 8 parts by volume of 10-normal sodium hydroxide, followed by stirring at 0° C. for 30 minutes, and then it is kept standing at room temperature for 16 hours. After dilution with water to 3 times its volume, the reaction mixture is passed through 200 parts by volume of cation exchange resin Amberlite IR–120 (H type), followed by washing. Amino acid is eluted with 800 parts by volume of 3% aqueous ammonia, and the solvent is distilled off under reduced pressure. The residue is dissolved in 0.5 normal acetic acid and is chromatographed with Dowex 1 x 8, followed by development with 0.5 normal acetic acid, whereby 0.500 part by weight of (3-oxo-isoxazolidin-5-yl)-α-aminoacetic is obtained.

Example 4

(A) The separation of threo and erythro isomers of (3-oxo-isoxazolidin-5-yl)-α-aminoacetic acid is carried out as follows:

A solution of 0.200 part by weight of the product in 2 parts by volume of a mixture of methanol, acetic acid and water (200:39:771 volume) is passed through anion exchange resin (Dowex 1 x 8 (200–400 mesh; acetate form) which is equilibrated with the said mixture, followed by development with the said mixture at the rate of 30 parts by volume per hour. 5 part by volume each of the eluate is collected, and numbered as fraction 1, 2, 3 . . . in order. Fractions Nos. 62–65, almost all of which is revealed by electrophoresis (10% acetic acid; 700 volts; 3.0 hours) to contain the erythro isomer, are concentrated and kept standing in a refrigerator, whereby 0.700 part by weight of erythro isomer of (3-oxo-isoxazolidin-5-yl)-α-aminoacetic acid is obtained as plates. Fractions Nos. 70–77 are concentrated under reduced pressure and kept standing, whereby 0.500 part by weight of platy threo isomer of (3-oxo-isoxazolidin-5-yl)-α-aminoacetic acid is obtained. As the mother liquor and fractions Nos. 66–69 are a mixture of threo and erythro isomers in nearly the same content, they are chromatographed repeatedly in the same way as mentioned above, to obtain fractions containing either erythro or threo isomer in excess amount, followed by recrystallization from water to obtain erythro or threo isomer.

Melting point of erythro isomer of (3-oxo-isoxazolidin-5-yl)-α-aminoacetic acid is 195–198° C. and that of threo isomer is 213–214° C.

(B) 0.100 part by weight of (3-oxo-isoxazolidin-5-yl)-α-aminoacetic acid is dissolved in 2 parts by volume of water. To the solution is added 2 parts by volume of aqueous solution saturated with copper acetate, followed by allowing the mixture to stand overnight. Then the precipitates formed are suspended in 10 parts by volume of water, followed by acidifying with dilute hydrogen chloride, to dissolve the precipitates. The solution is passed through 10 parts by volume of Amberlite IR–120 (H type), followed by repeated washing. From the eluate with 30 parts by volume of 3% aqueous ammonia, the solvent is distilled off under reduced pressure, whereby 0.450 part by weight of erythro isomer of (3-oxo-isoxazolidin-5-yl)-α-aminoacetic acid having the melting point of 195°–198° C. (decomposed) is obtained.

Filtrate of the copper salt is treated in the same way as mentioned above to give 0.400 part by weight of colorless, platy threo isomer of (3-oxo-isoxazolidin-5-yl)-α-aminoacetic acid having the melting point of 213–214° C. (decomposed).

(C) 0.300 part by weight of (3-oxo-isoxazolidin-5-yl)-α-aminoacetic acid is dissolved in 8 parts by volume of ethanol, and then dry hydrogen chloride gas is passed through the solution for 4 hours. After cooling, the mixture is filtered and the filtrate is concentrated to give 0.0023 part by weight of diethyl β-aminooxyglutamate.

(D) 3.5 parts by weight of β-aminooxyglutamate is dissolved in 10 parts by volume of water, followed by adding dropwise a solution of 2.55 parts by weight of sodium hydroxide in 5 parts by volume of water for 30 minutes. The reaction mixture is stirred at room temperature for 2 hours, adjusted to 50 parts by volume with water, and passed through 200 parts by volume of cation exchanger, Amberlite IR–120 (H type), followed by eluting with 300 parts by volume of 1-normal aqueous ammonia. The eluate is concentrated to give 0.457 part by weight of powdery product. The powder is chromatographed by employing a column packed with cellulose powder, followed by development with a mixture of normal butanol, acetic acid and water (1:1:1 volume). Fractions which show the same Rf value with (3-oxo-isoxazolidin-5-yl)-α-aminoacetic acid extracted from *Tricholoma muscarium* Kawamura are collected, followed by distillation of the solvent to give 0.450 part by weight of (3-oxo-isoxazolidin-5-yl)-α-aminoacetic acid.

(E) To an aqueous solution of 16 parts by weight of (3-oxo-isoxazolidin-5-yl)-α-aminoacetic acid is added 4 parts by weight of sodium hydroxide, followed by concentrating to dryness under reduced pressure, whereby 18 parts by weight of monosodium (3-oxo-isoxazolidin-5-yl)-α-aminoacetate is obtained.

Having thus disclosed this invention, what is claimed is:

1. A compound of the formula

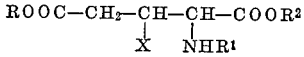

wherein R and $R^2$ are respectively lower alkyl, X is halogen and $R^1$ is a member selected from the group consisting of H, acetyl, trifluoroacetyl and benzoyl.

2. A compound of the formula:

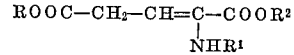

wherein R and $R^2$ are respectively lower alkyl, and $R^1$ is a member selected from the group consisting of H, acetyl, trifluoroacetyl and benzoyl.

3. A compound according to claim 1, said compound being the diethyl β-chloroglutamate.

4. A compound according to claim 1, said compound being the diethyl β-chloro-N-benzoylglutamate.

5. A compound according to claim 1, said compound being the diethyl β-chloro-N-trifluoroacetylglutamate.

6. A compound according to claim 1, said compound being the diethyl β-chloro-N-acetylglutamate.

7. A compound according to claim 2, said compound being the diethyl N-acetyl-α,β-dehydroglutamate.

References Cited

UNITED STATES PATENTS 2,828,327   3/1958   Dazzi _____ 260—471

LORRAINE A. WEINBERGER, *Primary Examiner.*

A. THAXTON, *Assistant Examiner.*

U.S. Cl. X.R.

260—307